United States Patent [19]
Levitt et al.

[11] 3,824,455
[45] July 16, 1974

[54] APPARATUS FOR GENERATING MUTUALLY ORTHOGONAL SINUSOIDAL SIGNALS UTILIZING ORTHOGONAL HALL PLATES WHICH ARE RELATIVELY ADJUSTABLE

[75] Inventors: Barry N. Levitt, Framingham; Francis L. Shorey, Concord, both of Mass.

[73] Assignee: Raytheon Company, Lexington, Mass.

[22] Filed: Dec. 6, 1971

[21] Appl. No.: 204,842

[52] U.S. Cl. .................... 324/34 R, 324/45, 310/2
[51] Int. Cl. .............................................. G01r 33/00
[58] Field of Search .......... 310/2, 10; 324/45, 34 R, 324/34 D

[56] References Cited
UNITED STATES PATENTS
3,184,620   5/1965   Leibowitz et al. ....................... 310/2

Primary Examiner—Robert J. Corcoran
Attorney, Agent, or Firm—Richard M. Sharkansky; Philip J. McFarland

[57] ABSTRACT

Angular displacement measuring apparatus wherein a pair of Hall effect cells orthogonally disposed and affixed to a stator element are disposed within a magnetic field generated by a pair of permanent magnets affixed to a rotor element is disclosed. In response to a control current passing through such pair of Hall effect cells a Hall effect voltage is generated within each one of such cells, the magnitude of such voltage being related to the sine and cosine of the angular displacement between the rotor element and stator element. The Hall effect cells are orthogonal to within a tolerance of two minutes of arc. Such tolerance is achieved by affixing each one of the Hall effect cells to one of two separate portions of the stator element.

1 Claim, 5 Drawing Figures

PATENTED JUL 16 1974  3,824,455

APPARATUS FOR GENERATING MUTUALLY ORTHOGONAL SINUSOIDAL SIGNALS UTILIZING ORTHOGONAL HALL PLATES WHICH ARE RELATIVELY ADJUSTABLE

The invention herein described was made in the course of or under a contract or subcontract thereunder, with the Department of Defense.

BACKGROUND OF THE INVENTION

This invention relates generally to angular displacement measuring apparatus adapted to provide signals representative of the sine and cosine of a measured angular displacement, and more particularly to such apparatus wherein a Hall effect call is used therein.

As is known in the art, various types of angular displacement measuring apparatus have been used for determining the relative angular orientation of a rotor element and an associated stator element. Such apparatus generally operate by having the electrical characteristic of an element incorporated therein vary in accordance with relative angular orientation. The variable electrical quantity of such element may be resistance, inductance (either self or mutual) or capacitance.

Angular displacement measuring apparatus operative by responding to variations is resistance are commonly called potentiometers. Such potentiometers generally include a resistive element mounted to the stator element having a knonw D.C. voltage across its ends and a sliding contact mounted to the rotor element. The D.C. voltage between one end of the resistive element and the sliding contact provides a measurement of the angular orientation of the rotor and stator elements. Such potentiometer may be adapted to provide signals representative of the sine and cosine of such measured angular orientation by providing a pair of properly formed resistive elements. Such adapted potentiometer is commonly called a sine - cosine potentiometer. While the adapted potentiometers are relatively inexpensive, lightweight and suitable for many applications, they are highly temperature sensitive, relatively inaccurate and unreliable and generally not suitable for use in missiles where high accelerations are experienced thereby. Such inaccuracy and unreliability is attributable, in part, to the physical contact required between the resistive element and the contact element.

To obviate the requirement for physical contact between the rotor element and the stator element and a concomitant effect on accuracy and reliability as in the case of potentiometer devices, variable inductance apparatus, commonly called "resolvers," have been used in many applications. A resolver generally includes a cylindrical rotor with two output coils wound in space quadrature with respect to each other and a rotor having wound thereon a pair of input windings, each one of such windings being energized by a known A.C. voltage. An A.C. voltage is induced in each one of the two output coils, the magnitude of the A.C. voltage induced in one varying in magnitude as the sine and the other as the cosine of an angle between the rotor and the stator.

As is known, a stable platform may be gimbal mounted for three degrees of freedom. Generally three gyros are mounted on such platform with each having its input axis disposed in a different one of mutually orthogonal directions. Such platform is generally pivotably mounted to an inner gimbal ring to allow for yaw (or azimuthal) motion of the platform. The inner gimbal ring in turn is pivotably mounted to an outer gimbal ring to allow for pitch motion of the platform. The outer gimbal ring finally is pivotably mounted to the vehicle containing the stable platform to allow for roll motion of the platform. Gimbal torque motors then are provided for driving each gimbal ring and the platform in response to rates sensed by the gyros in order to maintain the platform angularly fixed in space. The torque motor provided to obtain azimuthal motion is controlled by one of the gyros. The torque motors to obtain pitch motion and roll motion are controlled by the other two gyros through a transformation resolver, such resolver being responsive to the azimuthal angle, meaning the angular orientation of the platform and the inner gimbal ring. Resolvers are also mounted to measure angular deviations between the inner and outer gimbal rings (i.e., pitch angle) and also to measure angular deviations between the outer gimbal ring and the vehicle (i.e., roll angle). The transformation resolver described above provides a measure of sine and cosine of the angular deviations between the inner gimbal ring and the platform (i.e., yaw angle).

When used in an inertial platform in a missile, it is always desirable that the resolvers used therein have high accuracy, high reliability, maximum compactness, minimum weight, and require minimum power and minimum cost. It is also desirable to have an angular displacement apparatus adapted to provide either an A.C. signal or D.C. signal representative of the angular displacement measured.

SUMMARY OF THE INVENTION

With this background of the invention in mind it is an object of the invention to provide an apparatus for measuring angular displacement over 360° and adapted to provide either an A.C. or D.C. signal representative of the sine and cosine of a measured angle, such apparatus being generally more suitable for use in applications such as in a missile's inertial platform than any such apparatus known heretofore.

This and other objects of the invention are attained generally by affixing to the outer element of a rotor - stator combination a magnet circuit means for producing a magnet flux across the interior portion of such outer element and affixing to the inner element of such combination a pair of Hall effect cells, each one of such cells being spatially disposed in quadrature relationship with the other and also disposed in the magnetic flux so as to develop a Hall effect voltage in each one of such cells, the amplitude of each voltage varying respectively in accordance with the sine and cosine of an angle defined by the relative angular displacement between the outer element and the inner element.

BRIEF DESCRIPTION OF THE DRAWINGS

Other objects and many of the attendant advantages of the invention will be readily appreciated as the same becomes better understood by reference to the following detailed description when considered in connection with the accompanying drawings wherein.

DETAILED DESCRIPTION OF THE DRAWINGS

Before describing preferred embodiments of the present invention the Hall effect will be briefly described. As is known, E. F. Hall observed that when a control current passes through a conductor (or a semiconductor), commonly called a Hall effect cell, a voltage is developed across the dimension of such cell perpendicular to the direction of flow of such control current in response to a magnetic field passing through the face thereof. The magnitude of such voltage is proportional to the cross product of magnetic intensity, H, and control current $i$; that is proportional to the product of the magnitude of the control current and the intensity of the magnetic field normal to the face of the cell.

Figure 1:
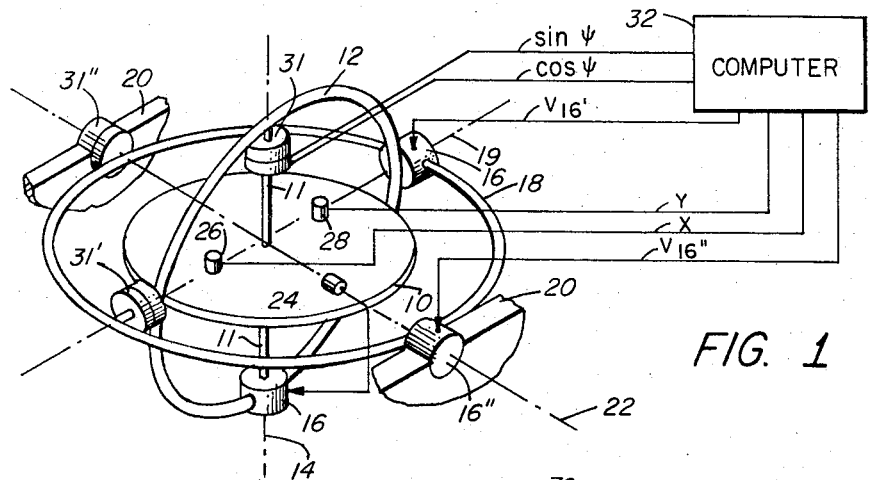
FIG. 1 shows a three axis, three degree of freedom platform incorporating angular displacement measuring apparatus which use the principles of the present invention.

Referring now to FIG. 1, a platform 10 having three degrees of freedom is shown. Such platform 10 is supported by a rod 11 and is adapted to be rotated with respect to an inner gimbal ring 12 about a yaw axis 14 by means of a torque motor 16. The relative angular rotation of the platform 10 with respect to the inner gimbal ring 12 is defined as the yaw angle $\Psi$ of the platform 10. The inner gimbal ring 12 is adapted to be rotated with respect to an outer gimbal ring 18 about a pitch axis 19 by means of a torque motor 16'. The relative angular rotation of the inner gimbal ring 12 with respect to the outer gimbal ring 18 is defined as the pitch angle $\theta$ of the platform 10. The outer gimbal 18 is adapted to rotate with respect to a support frame 20 about a roll axis 22 by means of a torque motor 16''. The relative angular rotation of the outer gimbal ring 18 with respect to the supporting frame 20 is defined as the roll angle $\phi$ of the platform 10.

The platform 10 is here attitude stabilized by properly processing each output of three gyros, here rate sensing gyros 24, 26, 28 to control torque motors 16, 16', 16''. In particular, rate sensing gyro 24 is affixed to platform 10 to produce a signal which is indicative of the angular rate of the platform 10 about yaw axis 14. Rate sensing gyros 26 and 28 are affixed to platform 10 so that the signal produced at each one's respective output is indicative of the angular rate of the platform 10 about a mutually orthogonal axis, i.e., the pitch and roll axes. The signal at the output of rate sensing gyro 26 is indicative of the angular rate of the platform 10 about the roll axis 22 and the signal at the output of the rate sensing gyro 28 is indicative of the angular rate of the platform 10 about pitch axis 19. However, because the pitch and roll axes 19, 22 may not be aligned, the angular rates sensed by rate sensing gyros 26, 28 must be transformed in accordance with the yaw angle $\Psi$ prior to being processed to control the torque motors 16', 16''. In particular, a signal $V_{16}'$ coupled to torque motor 16' must be derived:

$$V_{16}' = X \sin \Psi + Y \cos \Psi$$

Eq. 1 where:
X is the angular rate sensed by rate sensing gyro 26; and Y is the angular rate sensed by rate sensing gyro 28;

and a signal $V_{16}''$ coupled to torque motor 16'' must be derived:

$$V_{16}'' = X \cos \Psi - Y \sin \Psi$$

Eq. 2

The functions $\sin \Psi$ and $\cos \Psi$ are here obtained by signals produced by angular displacement measuring apparatus 31, the details of which will be described later. Such apparatus 31 is mounted between the inner gimbal ring 12 and the rod 11. The signals produced by such apparatus 31 and those produced at the output of rate sensing gyros 26 and 28 are combined in accordance with Equations (1) and (2) in a computer 32. Computer 32 therefore produces the signals $V_{16}'$ and $V_{16}''$ respectively, as shown. Angular displacement measuring apparatus 31' and 31'', mounted as shown, are used to provide a measure of roll angle $\phi$ and pitch angle $\theta$ in a manner to be described.

Figure 2:
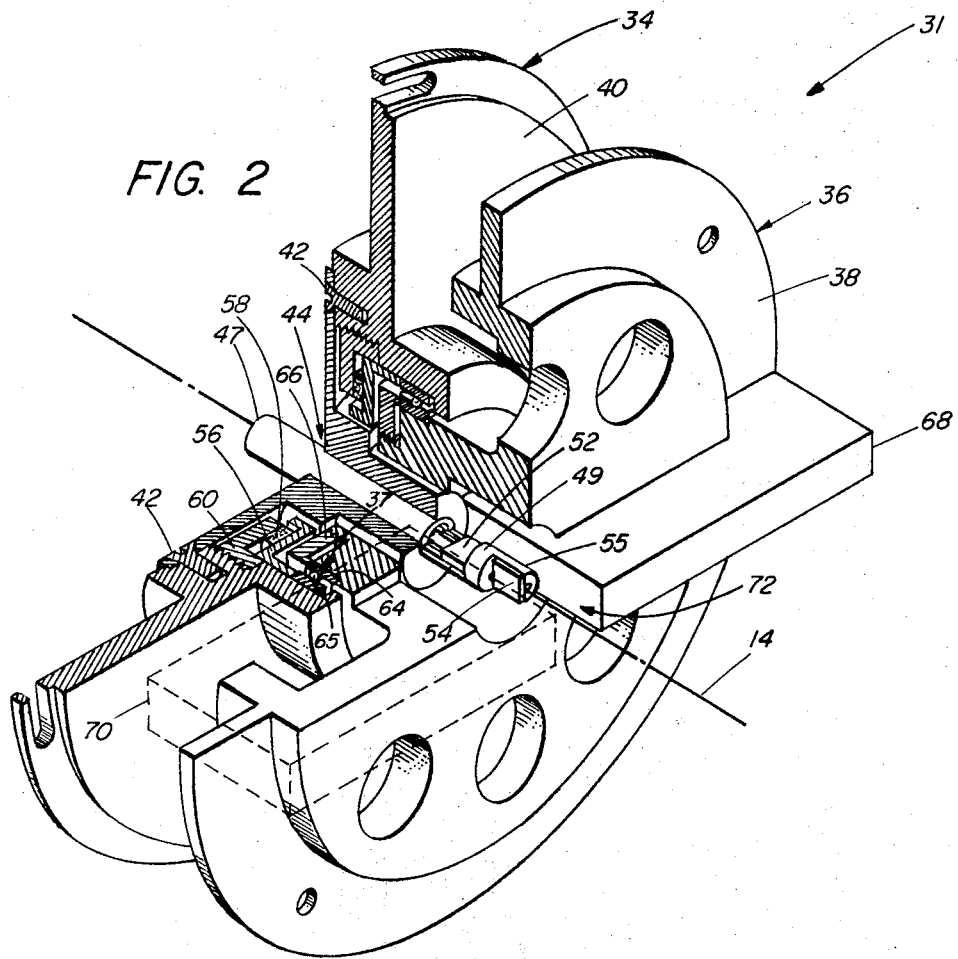
FIG. 2 shows an isometric cut-away drawing of the angular displacement measuring apparatus.

Referring also to FIG. 2 a detailed description of an exemplary one of angular displacement measuring apparatus 31, 31', 31'', here 31, is shown. Such apparatus 31 includes a stator assembly 34 (to be described) and its associated rotor assembly 36 (to be described) adapted to rotate relative to the other about an axis (here yaw axis 14) in bearings 37. Rotor assembly 36 may be affixed to inner gimbal ring 12 (FIG. 1) by mounting flange 38 and stator 34 may be affixed to rod 11 (FIG. 1) by mounting flange 40.

Figure 3:
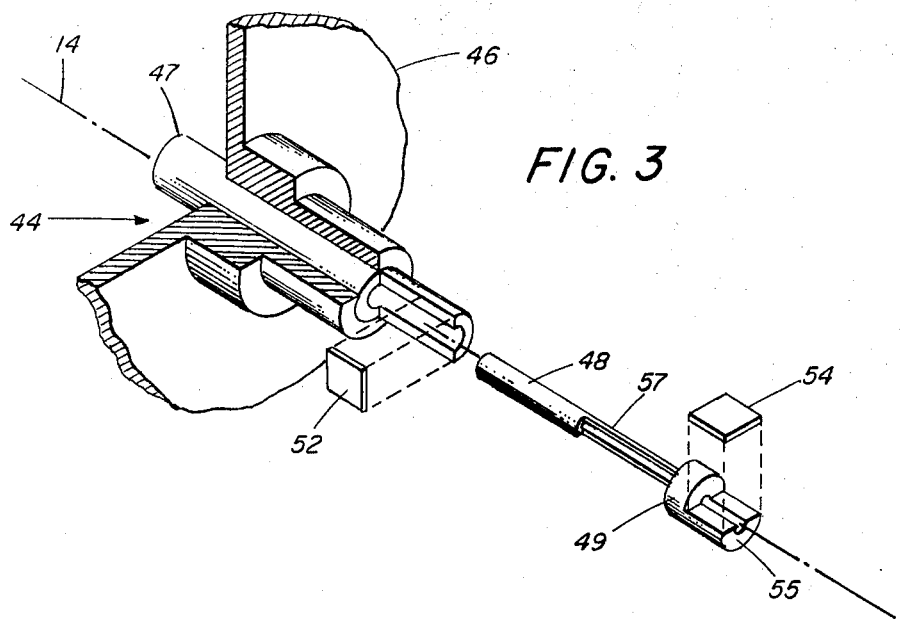
FIG. 3 shows a developed view of a portion of the angular displacement measuring apparatus shown in FIG. 2.

Stator assembly 34 has affixed thereto, as by screws 42, a shaft assembly 44. Such shaft assembly 44 is assembled in a manner now to be described. In particular, referring also to FIG. 3, one end of shaft assembly 44 includes a mounting plate section 46 through which screws 42 affix such mounting plate section 46 to mounting flange 40 of the stator assembly 34. A hollow rod 47 is force fitted to mounting plate section 46. Such hollow rod 47 is a hollow cylindrical rod except at one end portion thereof. At such end portion such hollow rod 47 has a semicircular cross-section, as shown. An inner rod 48 is insertable into hollow rod 47. Such inner rod 48 has a stop flange 49 to limit the amount such inner rod 48 is inserted into hollow rod 47. After such inner rod 48 is inserted as just described a Hall effect cell 52 is first disposed symmetrical about yaw axis 14 and then affixed to the semicircular cross-section portion of hollow rod 47 as indicated in the Figures by a suitable epoxy. A Hall effect cell 54 is first disposed symmetrical about yaw axis 14 and then affixed to portion 55 of inner rod 48 by a suitable epoxy. Hollow rod 47 and inner rod 48 are then rotated with respect to each other using a precision indexing head so that the Hall effect cells 52, 54 are oriented 90° to each other to within close tolerances, say ± 2 min. of arc in a manner to be described in detail. It is noted that portion 57 of inner rod 48 is undercut so that such rotation will not interfere with the affixed Hall effect cell 52. The use of a separate inner rod 48 was necessary because conventional machining and affixing methods could not achieve perpendicularity of the Hall effect cells 52, 54 to the desired tolerance. After the hollow rod 47 and inner rod 48 are properly aligned, as described, a suitable epoxy is placed in any convenient location to prevent further relative rotation between hollow rod 47 and inner rod 48. The leads (not shown) coupled to each Hall effect cell 52, 54 pass through a hole drilled through the center of shaft 44 (i.e., coaxial with yaw axis 14). To complete the stator assembly 34 an outer bearing race 65 (annular in shape and supported by mounting flange 40, support member 56, washer 58 and cap 60) is provided. Cap 60 is threadably fastened to mounting flange 40 (as shown). Cap 60, washer 58 and support member 56 are annular in shape and symmetrical about yaw axis 14.

Rotory assembly 36 has supported thereto an inner bearing race 64, annular in shape and supported by support member 66. Support member 66 is threadably fastened to mounting flange 38 (as shown). A pair of magnets 68, 70 (here permanent magnets) are affixed to mounting flange 38 through slots (not numbered) provided in such flange by a suitable epoxy. Magnet 70 is outlined by dotted lines for convenience in illustrating the angular displacement measuring apparatus 31. The magnets 68, 70 are disposed relative to each other such that a magnetic circuit is formed therebetween and in particular a magnetic field is produced across a gap 72. In particular, such magnetic field is substantially uniform in the region of the gap 72 occupied by Hall effect cells 52 and 54.

In order to understand the operation of angular displacement measuring apparatus let us first assume that, in a null condition, the face of Hall effect cell 52 is orthogonal to the magnetic field across gap 72 and consequently the face of Hall effect cell 54 is parallel to such field and the face of Hall effect cell 52 is orthogonal to such field. Then, as the rotor assembly 36 is continuously rotated relative to stator assembly 38 about yaw axis 14, the magnetic flux orthogonal to the face of each Hall effect cell 52, 54 will vary sinusoidally and consinusoidally respectively. Consequently, for the reason discussed, if a control current passes through the Hall effect cells 52, 54 in a direction parallel with yaw axis 14 a voltage will be developed across each cell. The magnitude of the voltage out of each cell will vary sinusoidally and cosinusoidally respectively. A little thought will make it apparent that the magnitude and sense of the relative angular orientation, here yaw angle $\Psi$, between the rotor assembly 36 and stator assembly 38 may be determined over 360° by a knowledge of both the sine and the cosine of such relative angular orientation.

Figure 4:
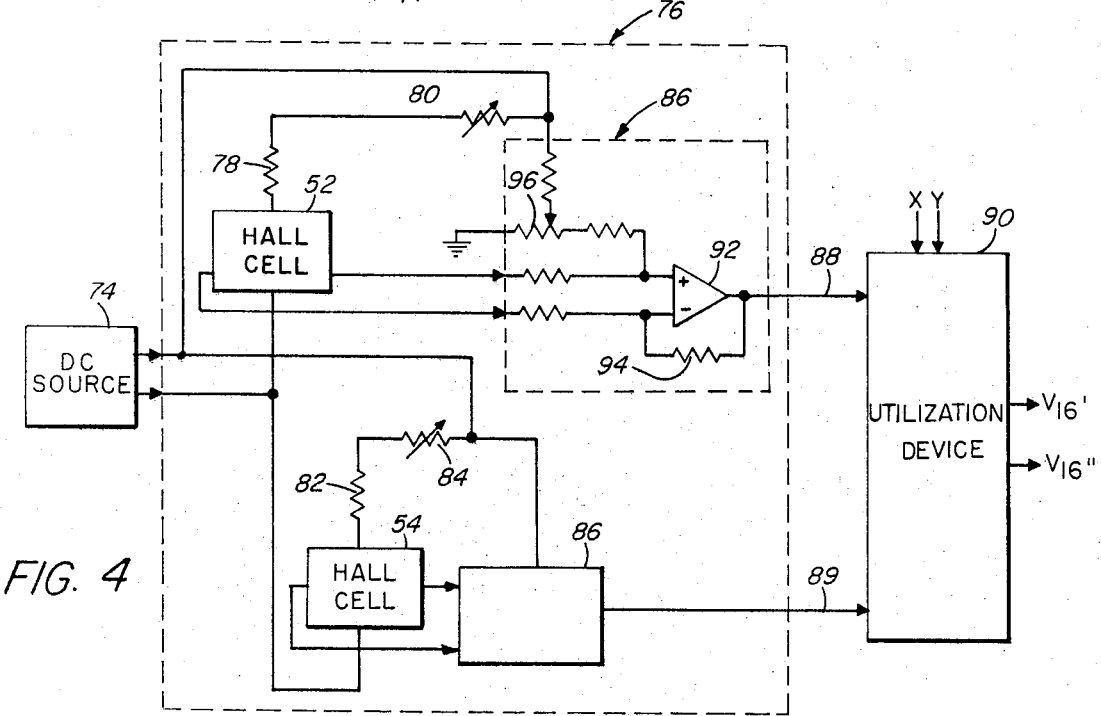
FIG. 4 shows a schematic diagram of D.C. electronic circuitry which may be used in the angular displacement measuring apparatus.

Referring now to FIG. 4, a D.C. source 74 is shown for supplying a control current for Hall effect cells 52, 54. Such cells 52, 54 are connected to form a portion of electronic circuitry 76. The desired amount of control current flowing through Hall effect cells 52, 54 is determined by resistors 78, 80 for cell 52 and resistors 82, 84 for cell 54. A Hall effect voltage, here a D.C. voltage, will, for the reasons previously discussed, appear across each one of such Hall effect cells 52, 54. The level of such voltage will be dependent on the angular orientation of rotor assembly 38 and stator assembly 40 (FIG. 2). Buffer amplifier networks 86 (each having a high input impedance) then differentially sense and amplify the Hall effect voltage appearing across each one of the Hall effect cells 52, 54. The signals at the output of each one of the networks 86 appear on lines 88 and 89. A little thought will make it apparent that the signal on line 88 may be represented by sin $\Psi$ and the signal on line 89 by cos $\Psi$. The signal on lines 88 and 89 are applied to a utilization device 90. Such utilization device 90 may be a computer for determining, from the voltage on lines 88, 89, the value of $\Psi$. With "X" and "Y" such computer provides the signals $V_{16}'$ and $V_{16}''$ as described above.

Each one of the networks 86 includes a differential amplifier 92. A feedback resistor 94, connected between the output and the input of each differential amplifier 92, is used to adjust the gains of the networks 86 so that the signals on lines 88 and 89 are balanced. That is, the maximum amplitude of both the "sinusoidal" and "cosinusoidal" signals on lines 88 and 89 is made equal by proper selection of the feedback resistor 94 in each network 86. Differential amplifier 92 has one of its inputs biased with respect to ground potential through variable resistor 96. Such variable resistor 96 is provided to remove any bias voltage inherent in either Hall effect cell 52 or 54. That is, a zero voltage output is produced by the Hall effect cell 52 on line 88 at $\Psi = 0°$, 180° and 360° and zero voltage output is produced by the Hall effect cell 54 on line 89 at $\Psi = 90°$ and 270°.

Figure 5:
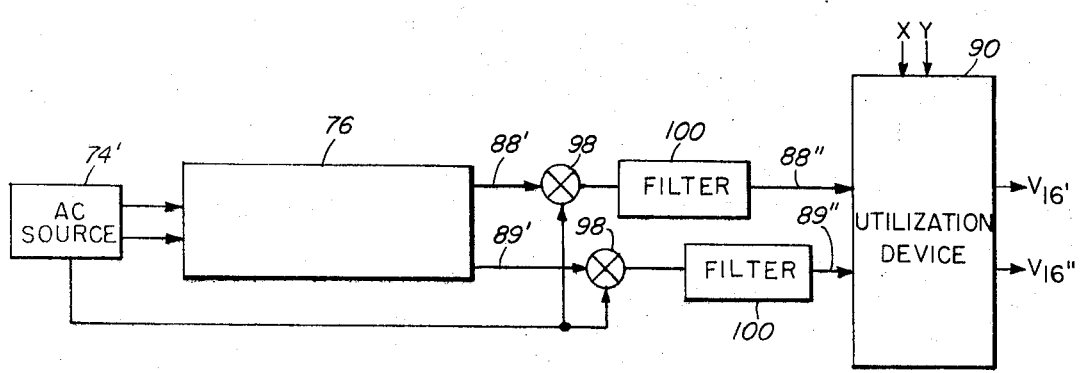
FIG. 5 shows a schematic diagram of A.C. electronic circuitry which may be used in the angular displacement measuring apparatus.

FIG. 5 shows an AC source 74' for supplying an AC control current to Hall effect cells 52, 54 through electronic circuitry 76. The signals on lines 88' and 89' may, therefore, now be represented sin $\Psi$ sin $2\pi ft$ and cos $\Psi$ sin $2\pi ft$ (where $f$ is the frequency of the A.C. control current), respectively. The signals on lines 88' and 89' are passed through mixers 98 and low pass filter 100, as shown, so that the signals on lines 88'' and 89'' may be represented as sin $\Psi$ and cos $\Psi$, respectively.

Having described the electronic circuitry 76 used with Hall effect cells 52, 54, the method used to achieve a perpendicularity between each one of such cells to a tolerance of ± 2 min. of arc will now be described in detail. Referring again to FIG. 2, after inner rod 48, with Hall effect cell 54 affixed thereto, is inserted into hollow rod 47, with Hall effect cell 52 affixed thereto, each such cell 52, 54 then has biased therefrom (via variable resistor 96 (FIG. 4) any inherent bias voltage (i.e. voltage produced within the cell in the absence of the magnetic field). The cells 52, 54 are then placed within the magnetic field previously described, that is, the rotor assembly and stator assembly are mechanically coupled as described. The stator assembly is rotated to an orientation such that a yaw voltage signal is obtained on line 88. The precision indexing head then further rotates the rotor stator assembly, from such orientation, 90° ± 2 min. of arc. The output on line 89 is read to check if the voltage thereon corresponds to zero voltage ± that voltage consistent with the ± 2 min. of arc tolerance. If such condition exists the inner rod 48 and hollow rod 47 are fastened as described. If such condition does not exist the inner rod 48 is rotated with respect to the hollow rod 47 so as to achieve a zero voltage output on line 89. The procedure outlined above is repeated until such tolerance is achieved.

The angle displacement measuring apparatus described above has been built and tested. The apparatus has been found to have a total accuracy of 2 min. of arc over angular measurements in the region of 0–6° and 10 min. of arc over the region of 360°. When compared to a conventional inductive type resolver having such total accuracy the apparatus described is lighter by a factor of 3.6 and uses 1/7 the power.

Having described the angular displacement measuring apparatus with a uniform magnetic field, as will now be obvious to one of ordinary skill in the art, such magnetic field may be shaped in any desired way such that the signals produced at the Hall effect cells vary other than sinusoidally and cosinusoidally. That is, the magnetic field may be shaped to increase the linear region of the apparatus.

We claim:

1. Apparatus for generating mutually orthogonal sinusoidal signals, comprising:
   a. an outer element having an interior region;
   b. magnetic circuit means, affixed to the outer element, to produce a substantially uniform magnetic field across a portion of the interior region;
   c. an inner element, rotatable within the interior region about an axis orthogonal to the magnetic field, such inner element including:
      i. a hollow rod having a first surface; and,
      ii. an inner rod, a first portion thereof being inserted within the hollow rod and a second portion thereof having a second surface;
   wherein the first surface and the second surface are disposed in the magnetic field;
   d. a pair of Hall effect cells, one thereof being affixed to the first surface and the other one thereof being affixed to the second surface; wherein a surface of each one of the pair of Hall effect cells is parallel to the axis; and,
   e. means for securing the inner rod to the hollow rod to fix the orientation of the surface of each one of the pair of Hall effect cells in a mutually orthogonal orientation.

* * * * *